(12) United States Patent
Sakai et al.

(10) Patent No.: US 6,508,126 B2
(45) Date of Patent: Jan. 21, 2003

(54) DYNAMIC QUANTITY SENSOR HAVING MOVABLE AND FIXED ELECTRODES WITH HIGH RIGIDITY

(75) Inventors: Minekazu Sakai, Kariya (JP); Seiki Aoyama, Toyohashi (JP); Hirotsugu Funato, Nagoya (JP)

(73) Assignee: Denso Corporation, Kariya (JP)

( * ) Notice: Subject to any disclaimer, the term of this patent is extended or adjusted under 35 U.S.C. 154(b) by 56 days.

(21) Appl. No.: 09/897,016

(22) Filed: Jul. 3, 2001

(65) Prior Publication Data

US 2002/0011107 A1 Jan. 31, 2002

(30) Foreign Application Priority Data

Jul. 21, 2000 (JP) ........................................ 2000-220923
Apr. 3, 2001 (JP) ........................................ 2001-105161

(51) Int. Cl.[7] ........................... G01P 15/125; G01L 1/00
(52) U.S. Cl. ................................ 73/514.32; 73/862.381
(58) Field of Search ....................... 73/514.32, 514.01, 73/862.381

(56) References Cited

U.S. PATENT DOCUMENTS

| 5,747,690 A | 5/1998 | Park et al. |
| 6,122,964 A | 9/2000 | Mohaupt et al. |
| 6,151,966 A | 11/2000 | Sakai et al. |
| 6,276,207 B1 * | 6/2001 | Sakai et al. ............... 73/514.16 |
| 6,308,567 B1 * | 10/2001 | Higuchi et al. ........... 73/504.12 |
| 6,450,029 B1 * | 9/2002 | Sakai et al. .................... 73/488 |

OTHER PUBLICATIONS

U.S. patent application Ser. No. 09/667,800, Sakai et al., filed Sep. 22, 2000.
U.S. patent application Ser. No. 09/438,293, Sakai et al., filed Nov. 12, 1999.
U.S. patent application Ser. No. 09/458,954, Higuchi et al., filed Dec. 10, 1999.

* cited by examiner

Primary Examiner—Richard A. Moller
(74) Attorney, Agent, or Firm—Law Offices of David G. Posz

(57) ABSTRACT

A dynamic quantity sensor has a weigh portion that is supported by a base portion to be displaced by a dynamic quantity, a movable electrode protruding from the weigh portion, and a fixed electrode protruding from the base portion and defining a detection interval with the movable electrode. The detection interval changes in response to displacement of the weight portion for detecting the dynamic quantity. Each of the movable electrode and the fixed electrode has a tapered plane shape with a width that decreases from a root portion toward a tip portion thereof.

19 Claims, 11 Drawing Sheets

DYNAMIC QUANTITY SENSOR HAVING MOVABLE AND FIXED ELECTRODES WITH HIGH RIGIDITY

CROSS REFERENCE TO RELATED APPLICATIONS

This application is based upon and claims the benefit of Japanese Patent Applications No. 2000-220923 filed on Jul. 21, 2000, and No. 2001-105161 filed on Apr. 3, 2001, the contents of which are incorporated herein by reference.

BACKGROUND OF THE INVENTION

1. Field of the Invention

This invention relates to a dynamic quantity sensor that detects a dynamic quantity such as acceleration based on a change in capacitance between a comb-shaped movable electrode and a comb-shaped fixed electrode.

2. Description of the Related Art

FIGS. 1 and 2 show this kind of dynamic quantity sensor. The dynamic quantity sensor is manufactured by performing well-known semiconductor manufacture techniques to a lamination substrate 10 such as a SOI (Silicon On Insulator) substrate that is composed of a first semiconductor substrate 11, a second semiconductor substrate 12 laminated with the first semiconductor substrate 11 with an insulating layer 13 interposed therebetween.

A groove 14 is formed in the second semiconductor layer 12, and an opening portion 13a is formed in the first semiconductor layer 11 and the insulation film 13. Accordingly, the first semiconductor layer 11 forms a frame-shaped base portion, and the second semiconductor layer 12 forms a beam structure.

The beam structure formed by the second semiconductor layer 12 is composed of a weight portion 210, which is supported by the base portion through beam portions 22 so that it can be displaced in a predetermined direction (direction Y indicated by an arrow in FIG. 1), and comb-shaped movable electrodes 240 protruding from the weight portion 210, and comb-shaped fixed electrodes 310, 320 protruding from the base portion 11 to face respective side faces of the comb-shaped movable electrodes 240 while defining a specific interval therebetween.

When a dynamic quantity is applied to the sensor, the weight portion 210 is displaced in the direction Y due to elastic forces of the beam portions 22 so as to change a capacitance in detection interval 40 defined between the movable electrodes 240 and the fixed electrodes 310, 320, and the dynamic quantity can be detected based on the change in capacitance in the detection interval 40.

SUMMARY OF THE INVENTION

An object of the present invention is to improve characteristics of a dynamic quantity sensor that has a pole-shaped movable electrode and a pole-shaped fixed electrode and detects a dynamic quantity based on a change in capacitance between the movable electrode and the fixed electrode.

According to a first aspect of the present invention, in a dynamic quantity sensor having a movable electrode and a fixed electrode defining a detection interval therebetween, at least one of the movable electrode and the fixed electrode has a tapered plane shape with a width that decreases from a root portion toward a tip portion of the one of the movable electrode and the fixed electrode. Accordingly, the one of the movable electrode and the fixed electrode can have an improved rigidity. Therefore, sticking caused by bending of the electrode can be prevented.

According to a second aspect of the present invention, a dynamic quantity is detected based on a change in capacitance of a detection interval between a fixed electrode and a movable electrode while applying, to the fixed electrode and the movable electrode, carrier wave signals having a carrier wave frequency. The carrier wave frequency is shifted from 1/n (n: positive integer) of a natural frequency of the fixed electrode when the fixed electrode performs flexural vibration. Preferably, the carrier wave frequency is shifted from 1/n (n: positive integer) of a natural frequency of the movable electrode when the movable electrode performs flexural vibration.

When the carrier wave frequency is shifted from 1/n of the natural frequencies of the fixed electrode and the movable electrodes, the fixed electrode and the movable electrode can be prevented from resonating to perform the flexural vibration due to the carrier wave signals, resulting in improved accuracy of sensor output.

According to a third aspect of the present invention, a carrier wave frequency of carrier wave signals applied for performing self-diagnosis of a dynamic quantity sensor is shifted from. 1/n (n: positive integer) of a natural frequency of a fixed electrode when the fixed electrode performs the flexural vibration. Preferably, the carrier wave frequency in the self-diagnosis is shifted from 1/n of a natural frequency of a movable electrode. Accordingly, the fixed electrode and the movable electrode are prevented from resonating to perform the flexural vibration in the self-diagnosis.

According to a fourth aspect of the present invention, at least one of a movable electrode and a fixed electrode has a root portion and a tip portion in a protruding direction thereof, the root portion having a rigidity larger than that of the tip portion. In this case, the one of the movable electrode and the fixed electrode can have an increased strength. Further, because the rigidity of the root portion is larger than that of the tip portion in the electrode, a natural frequency of the electrode can be easily made larger than a carrier wave frequency of carrier wave signals used for a normal operation or self-diagnosis of the sensor.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENTS

First Embodiment

Figure 1:
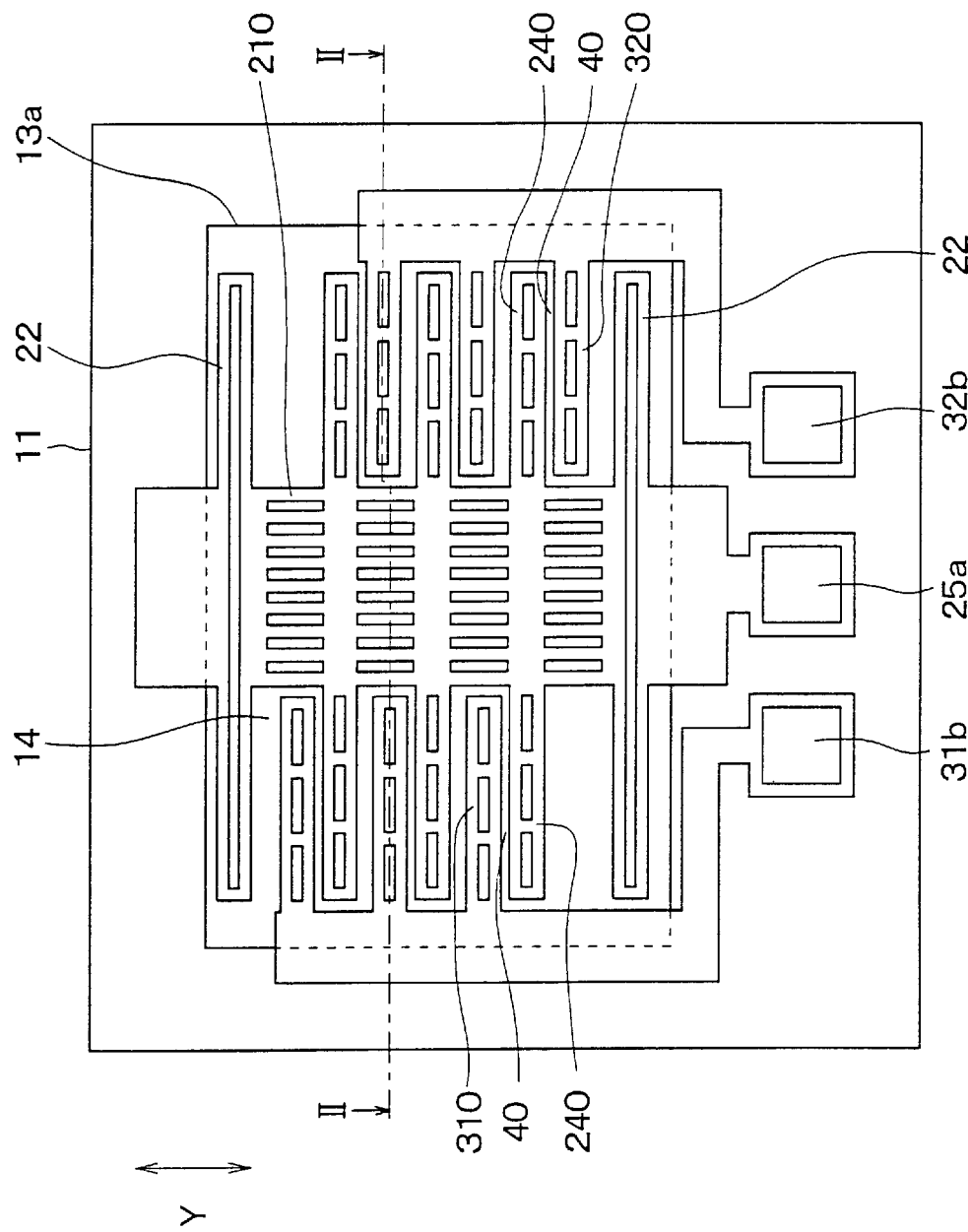
FIG. 1 is a plan view showing a dynamic quantity sensor according to a related art.
Figure 2:
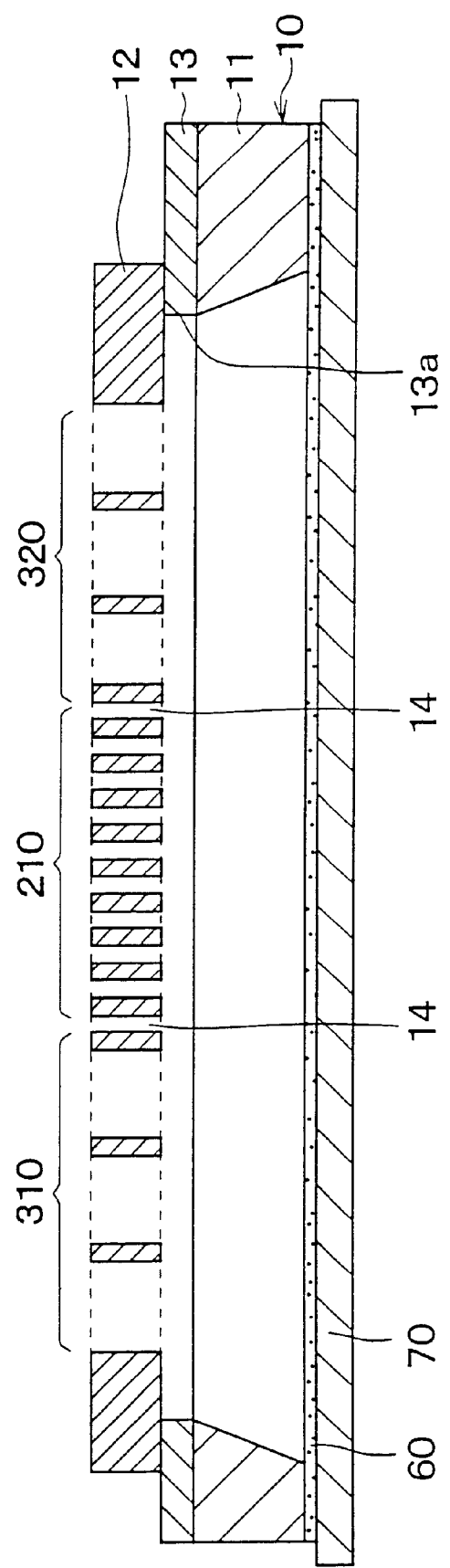
FIG. 2 is a cross-sectional view showing the dynamic quantity sensor, taken along line II—II in FIG. 1.

In the conventional dynamic quantity sensor shown in FIGS. 1 and 2, the electrodes may be bent when an excessive dynamic quantity is applied thereto. The bending of the electrodes can cause sticking (meaning that the movable and fixed electrodes are attached to each other by an electrostatic force acting therebetween). A first preferred embodiment of the present invention is to prevent the sticking caused by bending of electrodes in a dynamic quantity sensor.

Figure 3:
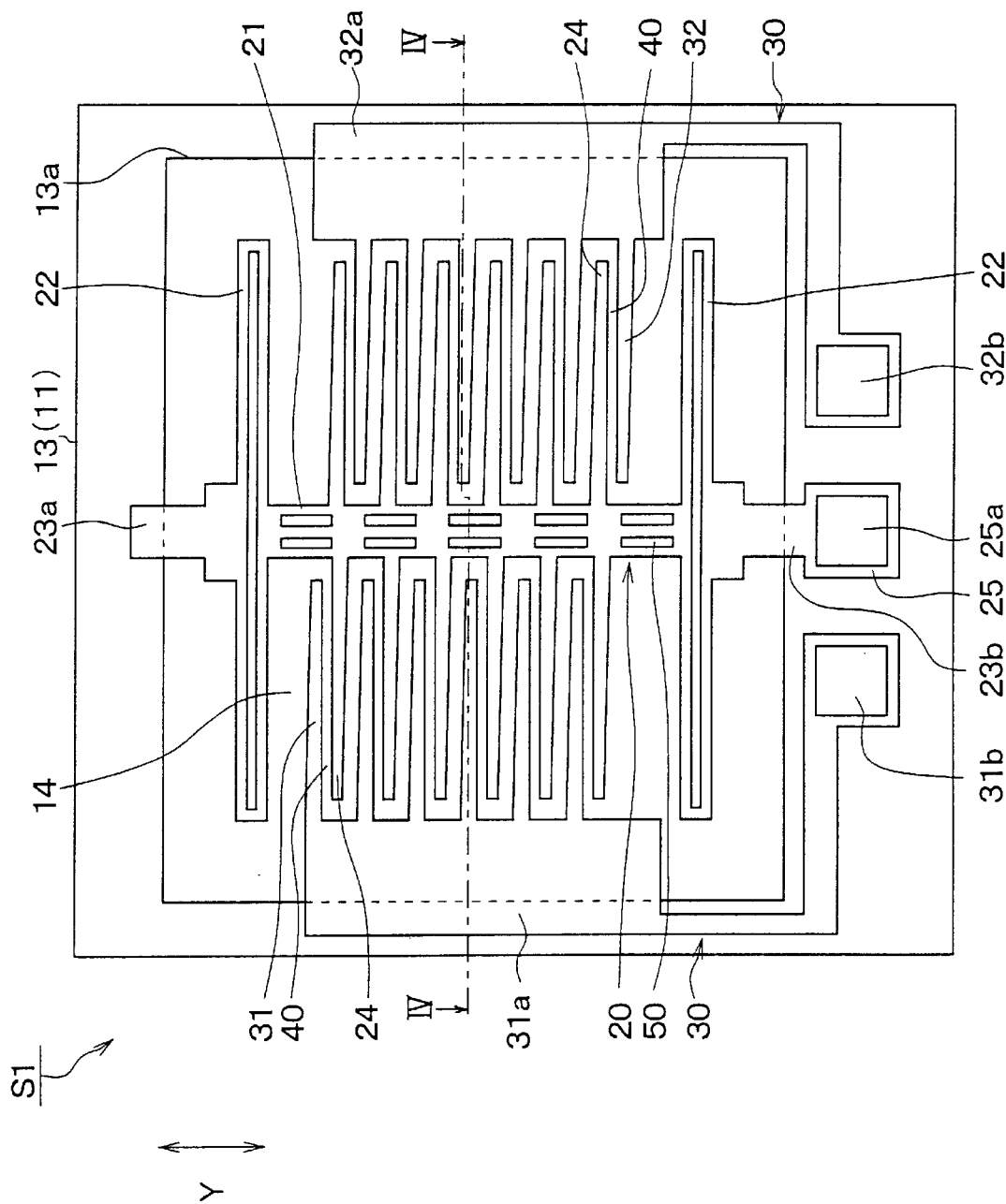
FIG. 3 is a plan view showing a semiconductor acceleration sensor according to a first preferred embodiment.
Figure 4:
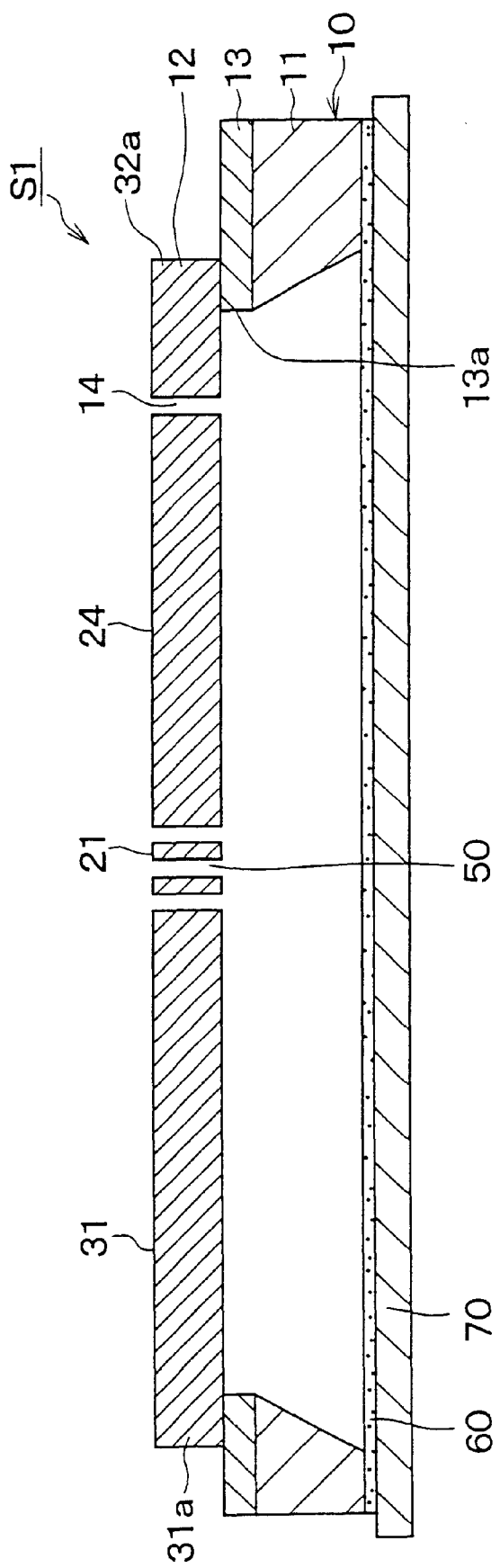
FIG. 4 is a cross-sectional view taken along line IV—IV in FIG. 3.

A dynamic quantity sensor in the fist embodiment is a differential capacitance type semiconductor acceleration sensor S1 that can be used as a vehicular acceleration sensor or a gyro sensor for controlling operation of an air bag system, ABS, VSC, or the like. FIGS. 3 and 4 show the semiconductor acceleration sensor S1 in the first embodiment, in which the same parts as those shown in FIGS. 1 and 2 are indicated with the same reference numerals.

The sensor S1 is manufactured by performing micromachine techniques to a semiconductor substrate. The semiconductor substrate constituting the sensor S1 is, as shown in FIG. 4, a rectangular SOI substrate 10 that is composed of a first silicon substrate (base) 11 as a first semiconductor layer, a second silicon substrate 12 as a second semiconductor layer, and an oxide film (insulation film) 13 interposed between the first and second silicon substrates 11 and 12.

A groove 14 is formed in the second silicon substrate 12 by trench etching or the like, so that a beam structure composed of a movable portion 20 and a fixed portion 30 separated from each other through the groove 14 is provided. Further, a rectangular opening portion 13a is formed in the oxide film 13 and the first silicon substrate 11 at a region corresponding to the beam structure 20, 30 by sacrificial layer etching. The fixed portion 30 is supported by the first silicon substrate 11 at an edge portion of the opening portion 13a.

The movable portion 20, disposed across above the opening portion 13a, is integrally connected to anchor portions 23a, 23b via beam portions 22. The anchor portions 23a, 23b are fixed to the oxide film 13 at the edge portion of the opening portion 13a, and is supported by the first silicon substrate 11. Accordingly, a weight portion 21 of the movable portion 20 and the beam portions 22 are suspended above the opening portion 13a.

Each of the beam portions 22 has a rectangular frame shape in which two beams are connected to each other at both ends thereof. The beam portion 22 has a spring function that enables to be displaced in a direction perpendicular to the longitudinal direction of the beams. Specifically, the beam portion 22 displaces the weight portion 21 in direction Y indicated by arrow Y in FIG. 3 upon receiving acceleration having a component in the direction Y, and restores the weight portion 21 in accordance with disappearance of the acceleration. Thus, the weight portion 21 is supported by the first silicon substrate 11 so that it can be displaced in the direction Y above the opening portion 13a, in response to acceleration applied thereto.

The weight portion 21 has side faces centering an axis along the direction Y, and each side face has several (six in the figure) pole shaped movable electrodes 24 protruding from the side face in a, direction approximately perpendicular to the direction Y and forming a comb-shape. Each of the movable electrodes 24 has a beam shape with a rectangular cross-section, and faces the opening portion 13a. Thus, the movable electrodes 24 integrally formed with the weight portion 21 can be displaced in the direction Y together with the weight portion 21.

On the other hand, the fixed portion 30 has a first group of fixed electrodes 31 provided at the left side in FIG. 3 and including several (six in the figure) fixed electrodes, and a second group of fixed electrodes 32 provided at the right side in FIG. 3 and including several (six in the figure) fixed electrodes. The first group of fixed electrodes 31 and the second group of fixed electrodes 32 are electrically independent of each other.

Each of the fixed electrodes 31, 32 has a beam (pole) shape with a rectangular cross-section. The fixed electrodes 31, 32 protrude from respective sides of the first silicon substrate 11 to be cantilevered by the first silicon substrate 11 while facing the opening portion and to be respectively disposed in a gap defined between adjacent two movable electrodes 24 at the left and right sides of the weight portion 21 in the figure.

Each of the fixed electrodes 31, 32 faces, at both side faces thereof, the side faces of the adjacent movable electrodes 24 while defining predetermined intervals therewith. Of the intervals at both sides of the fixed electrode, a narrower one is a detection interval 40 that is used for detecting a change in electrostatic capacitance when detecting the acceleration, and a wider one at the opposite side is a non-detection interval that is not used for detecting the change in electrostatic capacitance when detecting the acceleration.

In the present embodiment, as shown in FIG. 3, each of the movable electrodes 24 and the fixed electrodes 31, 32 has a plane shape that is tapered from the root portion toward the tip portion thereof (hereinafter, referred to as a tapered shape). That is, each tooth-like electrode 24, 31, or 32 has a width that is gradually decreased from the root portion (at the side of the weight portion in the case of the movable electrode 24) toward the tip portion in the protruding direction (longitudinal direction) thereof. In the present embodiment, not only the movable electrodes 24 but also the fixed electrodes 31, 32 respectively have the tapered shape, i.e., have a trapezoid shape. For example, each electrode can have a length of 200 μm in the protruding direction thereof, a width of 4 μm at the root portion, and a width of 2 μm at the tip portion.

Further, in the detection interval 40, the mutually facing side faces of the movable electrode 24 and the fixed electrode 31 or 32 are provided to be perpendicular to the direction Y. Each side face of both the movable electrode 24 and the fixed electrode 31, 32 is a rectangle as shown in FIG. 4, thereby securing a facing area in the detection interval 40. The distance of the detection interval 40 is constant from the root portions toward the tip portions of the electrodes, and can be set to be, for example, about 3 μm.

On the other hand, in the non-detection interval, the mutually facing side faces of the movable electrode 24 and the fixed electrode 31 or 32 are disposed crosswise with respect to the direction Y by the tapered degree. The distance of the non-detection interval is also constant from the root portions toward the tip portions of the mutually facing electrodes, and is set to be, for example, about 9 μm.

Wiring portions 31a, 32a are formed for the respective fixed electrodes 31, 32, with fixed electrode pads 31b, 32b provided at specific positions for wire bonding. A wiring portion 25 for the movable electrodes 24 is formed in a state where it is integrally connected to one of the anchor portions 23b, and also has a movable electrode pad 25a at a specific position thereof for wire bonding. The electrode pads 25a, 31b, 32b are formed from, for example, aluminum.

Further, the weight portion 21 has several rectangular through holes 50 that penetrate the weight portion 21, thereby forming a rigid-frame structure. Accordingly, the movable portion 20 is lightened, and its torsional strength is improved.

Furthermore, as shown in FIG. 4, the sensor S1 is fixedly bonded to a package 70 by adhesive 60 at the back surface of the first silicon substrate 11 (at the surface at an opposite side of the oxide film 13). The package 70 accommodates therein a circuit unit (circuit means) 80 explained below. The circuit unit 80 is electrically connected to the respective electrode pads 25a, 31b, and 32b by wire bonding using wires (not shown) made of gold or aluminum.

In this constitution, a first capacitance (CS1) is produced in the detection interval 40 between the first group of fixed electrode 31 and the movable electrode 24, while a second capacitance (CS2) is provided in the detection interval 40 between the second group of fixed electrode 32 and the movable electrode 24. When acceleration acts on the sensor S1, the entirety of the movable portion 20 is displaced in the direction Y due to the spring functions of the beam portions 22, and the respective capacitances CS1, CS2 change in accordance with displacements of the movable electrodes 24. Then, the circuit unit 80 detects the acceleration based on the change in differential capacitance, (CS1–CS2), between the movable electrode 24 and the fixed electrodes 31, 32.

In addition, the sensor S1 of the present embodiment can perform self-diagnosis of the detection performance thereof by monitoring the change in capacitance that is caused by forcibly applying a signal to the movable portion 20 so that the movable portion 20 is displaced from its initial position by a specific amount without acceleration.

Figure 5:
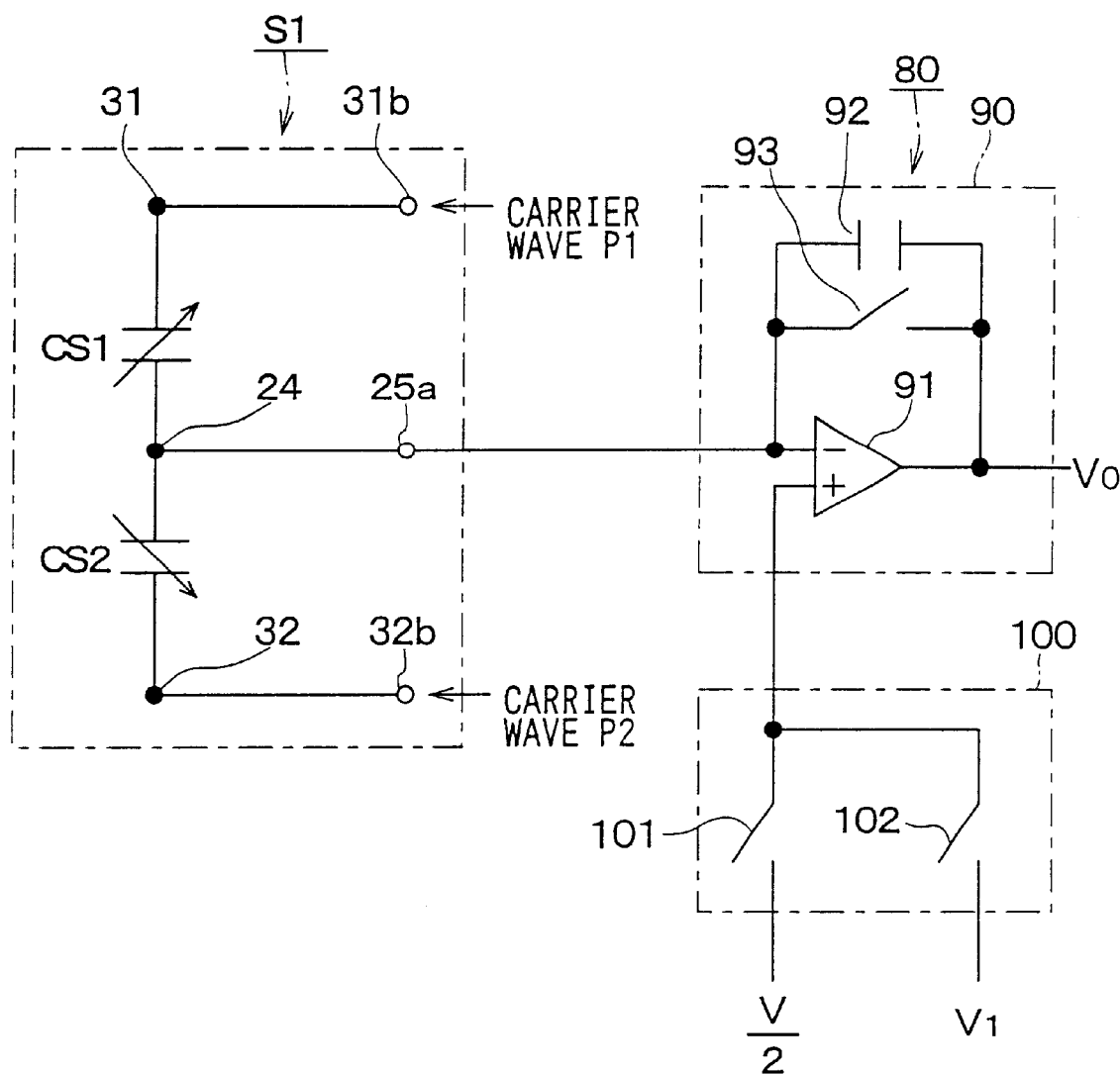
FIG. 5 is a schematic view showing a configuration of a circuit unit of the sensor shown in FIG. 3.

The acceleration detection method and the self-diagnosis method of this sensor S1 are specifically describe below referring to FIG. 5 showing the constitution of the circuit unit 80.

The circuit unit 80 has a C-V conversion circuit (switched capacitance circuit) 90 and a switch circuit 100. The C-V conversion circuit 90 converts the difference between changes of the capacitances CS1, CS2 into a voltage to be outputted. This C-V conversion circuit 90 is composed of an operational amplifier 91, a capacitor 92 having capacitance Cf, and a switch 93.

The operational amplifier 91 has an inverting input terminal that is connected to the movable electrodes 24 via the movable electrode pad 25a. The capacitor 92 and the switch 93 are connected in parallel between the inverting input terminal and the output terminal of the operational amplifier 91. Either voltage of V/2 and $V_1$ (different from V/2) is inputted into a noninverting input terminal of the operational amplifier 91 from respective power sources (not shown) through the switch circuit 100. The switch circuit 100 is composed of two switches 101, 102. The switches 101, 102 are operated so that one is opened when the other one is closed.

The circuit unit 80 further includes a control circuit (not shown). The control circuit inputs carrier wave P1, which periodically changes at given amplitude V, into the first group of fixed electrodes 31 through the fixed electrode pad 31b. The control circuit further inputs carrier wave P2 into the second group of fixed electrodes 32 through the fixed electrode pad 32b. The carrier wave P2 has a phase shifted from the carrier wave P1 at 180°, and an amplitude v identical with that of the carrier wave P1. The control circuit further can control closing/opening of the switches 93, 101, 102 at predetermined timings.

Figure 6:
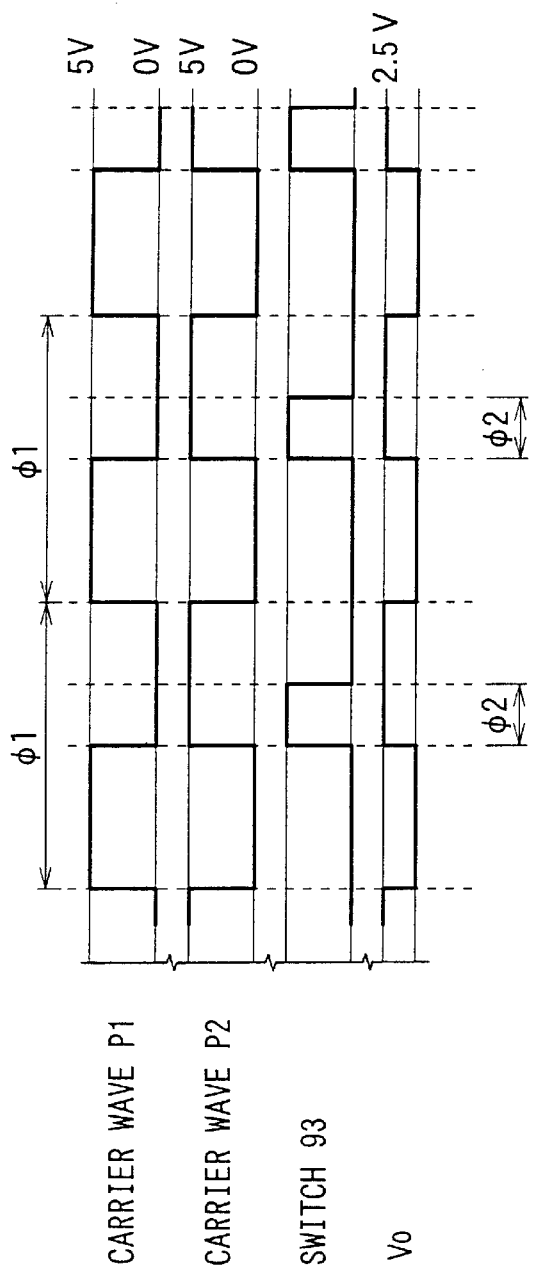
FIG. 6 is a graph showing signal waveforms in the circuit unit in a normal operation.

First, the acceleration detection method, i.e., a state where a detection signal is applied to detect the acceleration (normal operational state), is explained referring to FIG. 6 showing signal waveforms. The carrier wave P1 (for example, frequency: 100 kHz, amplitude: 0–5V) outputted from the control circuit described above is a rectangular wave signal having a given amplitude, in which a high level and a low level change in a period Φ1 (for example, 10 μs). The carrier wave P2 is a rectangular wave signal, a voltage level of which is inverted with respect to that of the carrier waver P1.

In the normal operation, the switch 101 is closed and the switch 102 is opened in the switch circuit 100 when the carrier waves P1, P2 are respectively transmitted to the fixed electrodes 31, 32. Accordingly, the voltage of V/2 is applied to the noninverting input terminal of the operational amplifier 91 so that a given voltage of V/2 (for example, 2.5V) is applied to the movable electrodes 24 as a movable electrode signal.

When no acceleration acts in this state, both the potential difference between the first group of fixed electrodes 31 and the movable electrodes 24 and the potential difference between the second group of fixed electrodes 32 and the movable electrodes 24 are respectively V/2, so that an electrostatic force between the first group of fixed electrodes 31 and the movable electrodes 24 generally balances with that between the second group of fixed electrodes 32 and the movable electrodes 24.

Also, in the normal operation, the switch 93 of the C-V conversion circuit 90 is opened and closed at timings shown in FIG. 6. The capacitor 92 is reset when the switch 93 is closed (at a period Φ2). On the other hand, the acceleration is detected when the switch 93 is opened. That is, the period for detecting the acceleration (detection period) is the period Φ1 excluding the period Φ2. Output voltage $V_o$ outputted from the C-V conversion circuit 90 in the detection period is represented by formula (1):

$$V_o = (CS1 - CS2) \cdot V'/Cf \qquad (1)$$

Here, V' is a voltage between the pads 31a and 32a, i.e. between the first group of fixed electrodes 31 and the second group of fixed electrodes 32, and Cf is the capacitance of the capacitor 92.

When acceleration is applied, the balance between the first capacitance CS1 and the second capacitance CS2 varies. The voltage corresponding to the difference in capacitance, CS1–CS2, is added as a bias to the output $V_o$, which is a voltage when no acceleration is applied, based on the formula (1), and the sum is outputted as output $V_o$ (for example, in a range of 0 to 5V). The output $V_o$ is processed by a signal processing circuit (not shown) including an amplifier and a low-pass filter, and is detected as an acceleration detection signal.

Figure 7:
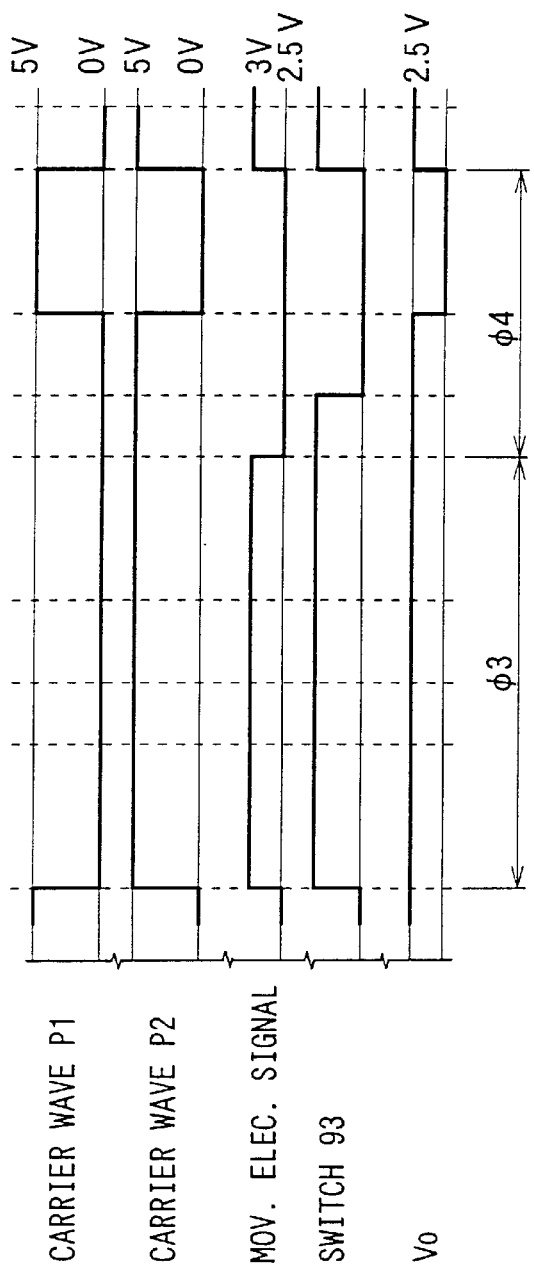
FIG. 7 is a graph showing waveforms in the circuit unit in self-diagnosis.

Next, the self-diagnosis operation is explained referring to FIG. 7 showing signal waveforms. As shown in FIG. 7, the control circuit described above inputs the carrier waves P1 and P2 as rectangular wave signals having a given amplitude V (in a range of 0 to 5V in the figure). Here, in period Φ3 (for example, 100 μs), the carrier waves P1 and P2 are respectively signals, voltage levels of which are constant but inverted to each other. For example, the carrier wave P1 is 0V, and the carrier wave P2 is 5V.

Further, in this period Φ3, when the carrier waves P1 and P2 are respectively transmitted to the fixed electrodes 31, 32, the switch 101 is opened and the switch 102 is closed in the switch circuit 100. Therefore, voltage of $V_1$ (for example, 3V) different from V/2 is applied to the noninverting input terminal of the operational amplifier 91, so that voltage $V_1$ is applied to the movable electrodes 24 as a movable electrode signal.

When voltage $V_1$ is applied to the movable electrodes 24, the balance of the electrostatic force in the normal operation is lost despite no actual acceleration applied thereto, and the movable electrodes 24 are drawn to one of the first group of fixed electrodes 31 and the second group of fixed electrodes 32, a potential difference of which from the movable electrodes 24 is larger than that of the other one. In the example shown in FIG. 7, the beam portions 22 deform so that the movable electrodes 24 are drawn to the first group of fixed electrodes 31. Accordingly, the weight portion 21 and the movable electrodes 24 are displaced apparently and integrally with the beam portions 22.

Thus, in the period Φ3, apparent acceleration is produced and applied to the movable electrodes 24 by forcibly displacing the movable portion 20 by a desired amount. Incidentally, because the switch 93 of the C-V conversion circuit 90 is closed in the period Φ3, the capacitor 92 is brought in a reset state in that period.

Next, in period Φ4 (for example, 10 μs), signal waveforms similar to those shown in the period Φ1 in FIG. 6 are applied between the movable electrodes 24 and the fixed electrodes 31, 32, and accordingly, the apparent acceleration (dynamic quantity) produced in the period Φ3 is detected in period Φ4. That is, the switch 93 of the C-V conversion circuit 90 is opened to enable the capacitor 92 to detect the acceleration, and the carrier waves P1, P2 are transmitted as in the normal operation. Further, the switch 101 is closed and the switch 102 is opened in the switch circuit 100 so that the given voltage of V/2 (for example, 2.5V) is applied to the movable electrodes 24 as a drive electrode signal.

Accordingly, in the period Φ4, the movable electrodes 24, which have been, for example, drawn to the first group of fixed electrodes 31, return to those initial positions to change the capacitance. Then, charges are produced in the capacitor 92 of the C-V conversion circuit 90 in response to the change in capacitance. As a result, the apparent acceleration produced in the period Φ3 can be detected. Thus, the self-diagnosis becomes possible by applying self-diagnosis signals (the carrier waves and the movable electrode signal) across the movable electrodes 24 and the fixed electrodes 31, 32 in a period of (Φ3+Φ4) forming one cycle.

Incidentally, according to the present embodiment, each plane shape of the movable electrodes 24 and the fixed electrodes 31, 32 is a tapered shape, i.e., is tapered from the root portion toward the tip portion thereof. Therefore, each of the movable electrodes 24 and the fixed electrodes 31, 32 can have an improved rigidity in the direction Y.

Because of this, even when excessive acceleration acts on the sensor S1, the bending of the movable electrodes 24 and the fixed electrodes 31, 32 can be suppressed. In consequence, sticking of the electrodes caused by the bending thereof can be prevented.

Also, according to the present embodiment, because each electrode can be lightened to improve the rigidity in comparison with an electrode having a rectangular plane shape, the resonance frequency of the lightened electrode can be made larger than that of the movable portion 20 as a whole, resulting in noise reduction.

Further, because each electrode can have improved rigidity and reduced weight as compared to the electrode having a rectangular plane shape, the movable portion 20 composed of the weight portion 21 and the movable electrodes 24 can also be lightened as a whole. This results in the following advantages in the self-diagnosis.

In the self-diagnosis, if the movable electrodes 24 are liable to bend, the vibration of the movable electrodes 24 may restrict the driving force from being sufficiently transmitted to the beam portions 22 that displaces the weight portion 21, so that the driving force damps. Further, if the movable portion 20 is heavy as a whole, the movable portion 20 is difficult to be displaced by the above-described self-diagnosis signals. Therefore, the apparent displacement amount of the weight portion 21 becomes smaller than a desired displacement amount, and the change in capacitance produced by returning the movable portion to its initial position is reduced. As a result, the output in the self-diagnosis is lessened.

To the contrary, according to the present embodiment, while improving the rigidity of each electrode 24, the movable portion 20 can be lightened. Therefore, in the self-diagnosis, the displacement amount of the weight portion 21 can be readily secured, and the output can be prevented from lessening.

Also, according to the present embodiment, because not only each movable electrode 24 but also each fixed electrode 31, 32 is formed into a tapered plane shape, an input dynamic range of the acceleration sensor can be enlarged. This advantage can be led by restricting bending of both the movable electrode 24 and the fixed electrode 31, 32.

Assuming that either of the movable electrode and the fixed electrode has a rectangular plane shape that bends easily as compared to the tapered shape, when acceleration is so large as to bend the electrode shaped to bend easily, the detection interval 40 changes more than the necessity. Accordingly, the capacitances CS1, CS2 between the movable and fixed electrodes change as if the acceleration has a magnitude larger than the actually applied acceleration. This is not desirable because it results in non-linearity of sensor output characteristics.

As opposed to this, if the bending of both movable electrode 24 and fixed electrode 31, 32 were restricted, the change in capacitance would appear in accordance with the actually applied acceleration even when the acceleration is large. Therefore, the non-linearity of the sensor output characteristics could be improved, and the input dynamic range could be enlarged.

In the sensor S1 of the present embodiment manufactured by adopting the semiconductor manufacture techniques, the plane shape of each electrode 24, 31, 32 can be defined by trench etching performed to the second silicon substrate 12. In this case, considering exposure accuracy and patterning accuracy for forming an etching mask, and etching accuracy, it is preferable that each of the electrodes 24, 31, 32 has a trapezoid plane shape with a tip portion having a specific width so as to attain high processing accuracy. However, the tip portion of each electrode may be sharp.

When each electrode has a tapered plane shape as in the present embodiment, the length of the electrode may be lengthened to increase the capacitance in the detection interval 40. In this case, the decrease in rigidity of the electrode caused by the increase in length thereof can be compensated with the increase in rigidity caused by the tapered shape. In addition, the sensitivity can be improved, and the Q value of vibration (oscillation) of the movable portion 20 can be reduced, resulting in improved sensor characteristics.

In the above-described embodiment, although both the movable electrode 24 and the fixed electrode 31, 32 are shaped into the tapered shape, respectively, only one of the movable electrode 24 and the fixed electrode 31, 32 may be formed into the tapered shape to prevent the sticking thereof.

Second Embodiment

In the dynamic quantity sensor shown in FIGS. 1 and 2, when the frequency of the carrier waves coincides with the natural frequency of each electrode 240, 310, or 320 not only in the normal operation receiving acceleration but also in the self-diagnosis operation, the electrode may resonate to perform flexural vibration, i.e., vibrate in the direction perpendicular to the longitudinal direction thereof. In this case, not only the detecting vibration (oscillation) but also the flexural vibration changes the detection interval, resulting in variation in sensor output.

Figure 8:
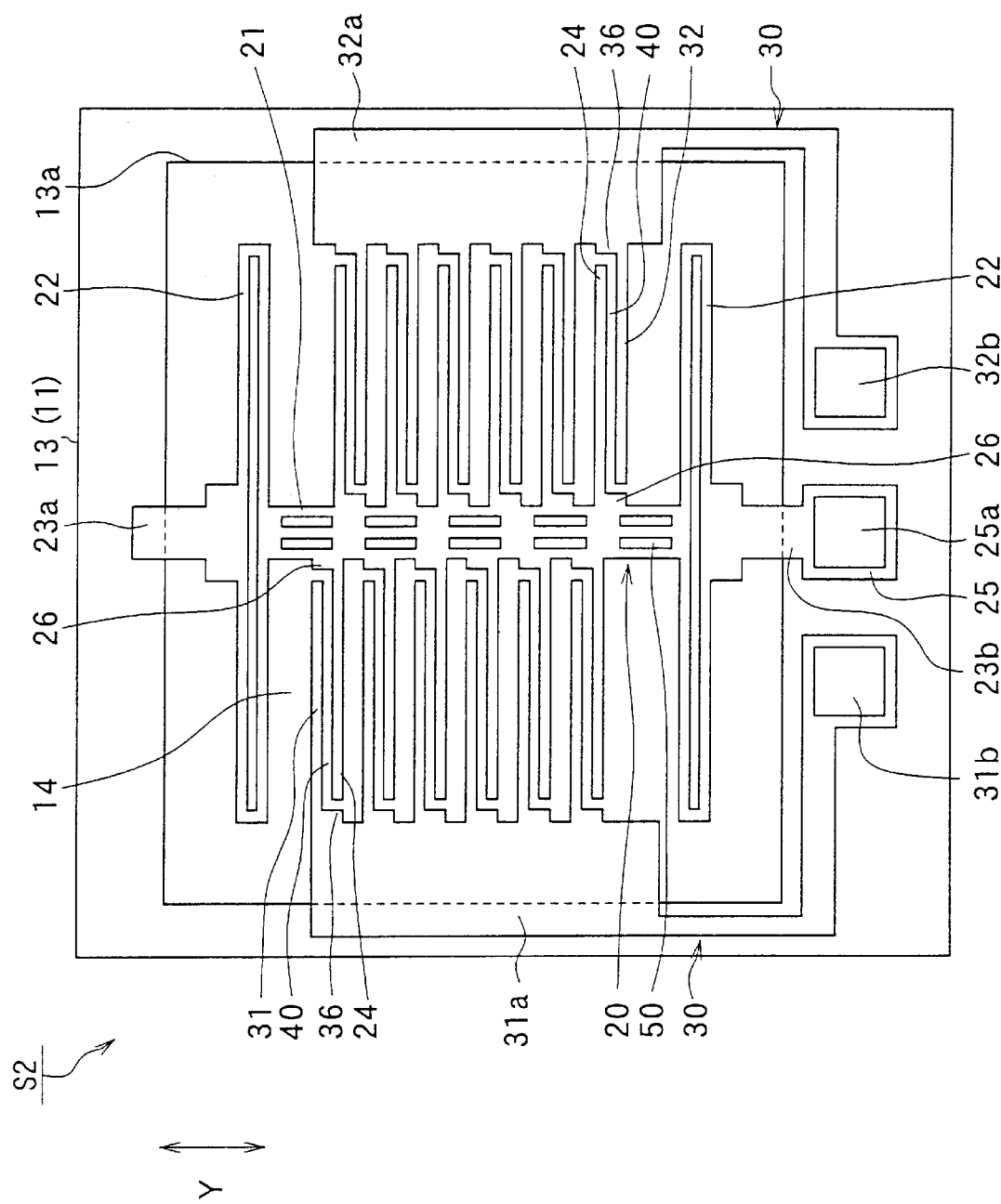
FIG. 8 is a plan view showing a semiconductor acceleration sensor according to a second preferred embodiment.

A second preferred embodiment of the present invention is made to restrict the flexural vibration of the electrode not only in the normal operation receiving acceleration but also in the self-diagnosis operation. A semiconductor acceleration sensor S2 according to the second embodiment is explained hereinafter referring to FIG. 8. In FIG. 8, the same or similar parts as those shown in FIGS. 3 and 4 are designated with the same reference numerals.

In the sensor S2 shown in FIG. 8, each of the movable electrodes 24 and the fixed electrodes 31, 32 has a pole shape formed with a widened part 26 or 36 at the root portion thereof so that the rigidity of the root portion becomes larger than that of the tip portion in the protruding direction (longitudinal direction) thereof. The other structural features are substantially the same as those described in the first embodiment. The acceleration detection method and the self-diagnosis method of the sensor S2 are also substantially the same as those explained in the first embodiment.

Figure 9:
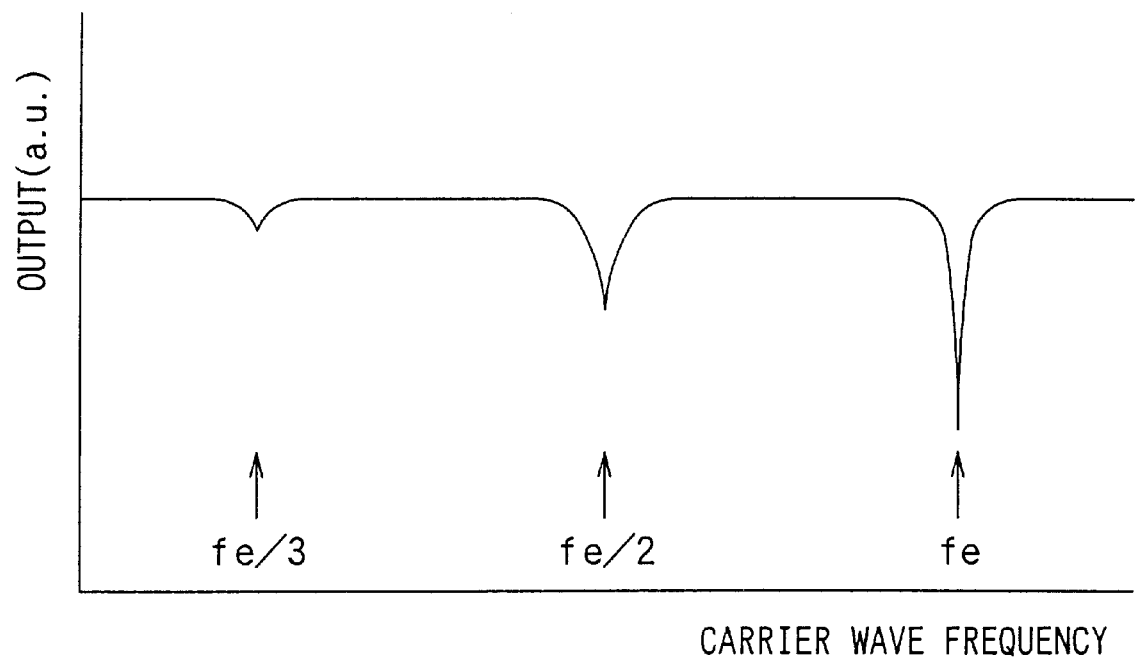
FIG. 9 is a graph showing a relation between a carrier wave frequency and a sensor output.

In the second embodiment, the relation between the frequency of the carrier wave signals (carrier wave frequency) and the sensor output $V_0$ was examined to restrict the above-described flexural vibration. The result is shown in FIG. 9. As shown in FIG. 9, it is revealed that the output changes (decreases) significantly when the carrier wave frequency is 1/n (n: positive integer) of the natural frequency of the movable electrode 24 or the fixed electrode 31, 32 that performs flexural vibration (with resonance frequency "fe" of the electrode). The output was constant at the other carrier wave frequency ranges.

To avoid this problem, in the present embodiment, the natural frequency (resonance frequency) of the electrode 24, 31, 32 when the electrode performs the flexural vibration is so controlled that 1/n (n: positive integer) of the natural frequency is shifted from the carrier wave frequency. Specifically, as described above, the rigidity of the electrode 24, 31, 32 is increased by widening the width of the root portion in comparison with the tip portion thereof in the protruding direction. Inconsequence, the natural frequency of the flexural vibration of the electrode is increased so that frequencies corresponding to 1/n (n: positive integer) of the natural frequency thereof are shifted from (i.e., do not coincide with) the carrier wave frequency.

For example, in the normal operation, the carrier wave frequency is in a range of about 50 kHz to about 150 kHz, and the frequency of externally applied acceleration is in a range of 0 to about 50 kHz. Therefore, when the natural frequency of each electrode is shifted to the lower side of the carrier wave frequency, there arises a possibility that the natural frequency of the electrode overlaps with the frequency of externally applied acceleration. Therefore, it is preferable that the natural frequency of the electrode is shifted to the higher side of the carrier waver frequency.

On the other hand, in the self-diagnosis operation, the carrier wave frequency is in a range of about 10 kHz to 25 kHz. In this operation, when the sensor S2 detects larger acceleration (for example, 250 G), the flexural vibration problem of the electrode becomes more prominent due to the following reason.

Figure 10:
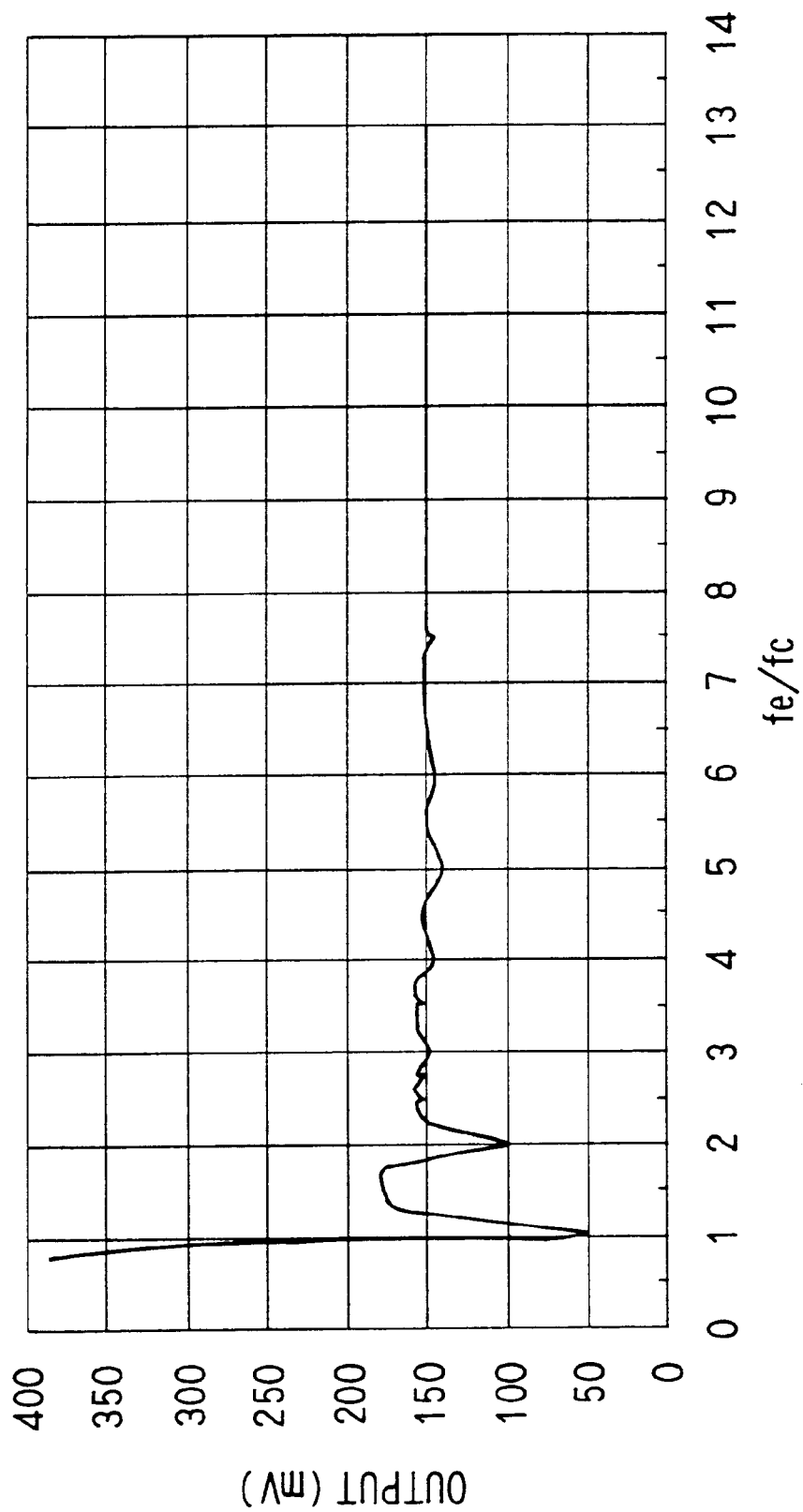
FIG. 10 is a graph showing ratio fe/fc of an electrode resonance frequency with respect to a carrier waver frequency and a sensor output in self-diagnosis.

FIG. 10 shows a relation between the sensor output and a ratio (fe/fc) of the electrode resonance frequency (fe) with respect to the carrier wave frequency (fc). As understood from FIG. 10, when the ratio fe/fc is 7 or more, the sensor output is stable. In other words, when the electrode resonance (natural) frequency is seven times or more as large as the carrier wave frequency, the sensor output is stable.

Here, when the sensor S2 is designed to detect acceleration of 50 G or less, the carrier wave frequency in the self-diagnosis is set at, for example, 10 kHz, and in this case, the ratio fe/fc exceeds 7. However, when the sensor S2 is designed to detect larger acceleration of 250 G or less, the carrier wave frequency in the self-diagnosis is increased and set at, for example, 25 kHz. In this case, the ratio fe/fc can be less than 7, and there arises the problem that the electrode resonates due to the carrier wave signal so as to adversely affect the sensor output as shown in FIG. 10.

Therefore, especially when the sensor is designed to detect larger acceleration, that is, especially when the ratio fe/fc in the self-diagnosis is less than 7, it is more effective that frequencies corresponding to 1/n (n: positive integer) of the natural frequency of the electrode are shifted from (i.e., do not coincide with) the carrier wave frequency.

Preferably, the frequency corresponding to 1/n (n: positive integer) of the natural frequency of the electrode is shifted (different) from the carrier wave frequency by ±5% or more. This is because about ±5% of the variation in carrier wave frequency can be produced due to variations at the circuit side for producing the carrier wave signal.

Especially, according to FIGS. 9 and 10, at least the frequencies corresponding to 1/1 and 1/2 (i.e., n=1 and 2) of the natural frequency of the electrode should be shifted from the carrier wave frequency. This is because the effect to the sensor output becomes small when the carrier wave signal has a low frequency corresponding to 1/3 of the natural frequency or 5 less.

Third Embodiment

Figure 11:
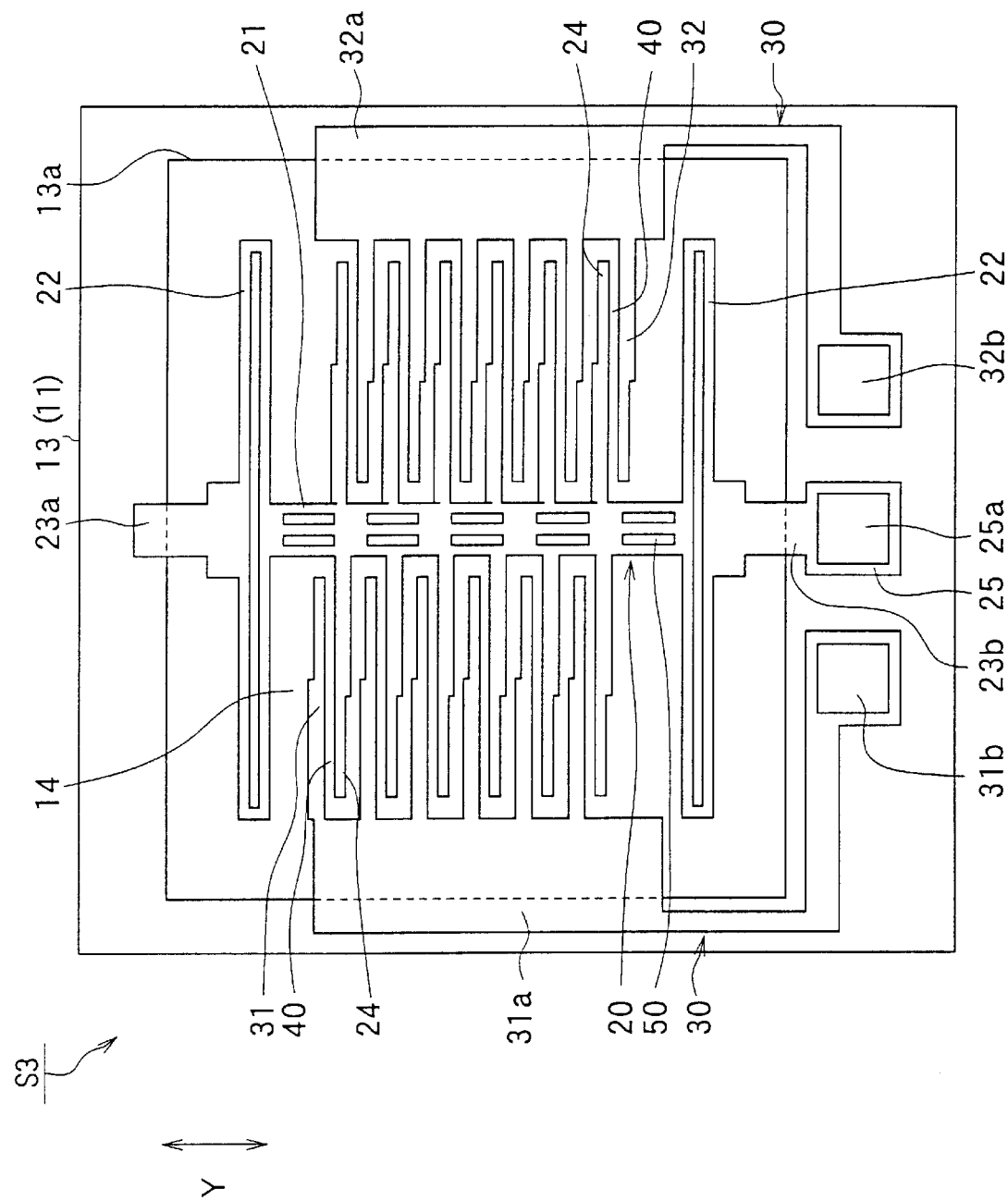
FIG. 11 is a plan view showing a semiconductor acceleration sensor according to a third preferred embodiment.

FIG. 11 shows a semiconductor acceleration sensor S3 in a third preferred embodiment of the present invention. In the third embodiment, the movable electrodes 24 and the fixed electrodes 31, 32 are modified in shape from those in the second embodiment, and the same or similar parts as those in the second embodiment are designated with the same reference numerals.

In the sensor S3 shown in FIG. 11, similarly to the sensor S2 in the second embodiment, each of the movable electrodes 24 and the fixed electrodes 31, 32 has a widened part at a root portion thereof widened in comparison with a tip portion in a protruding direction thereof. In this embodiment, the side face of the electrode 24, 31, or 32 at an opposite side of the detection interval 40 protrudes in direction Y to form the widened part.

Accordingly, as in the second embodiment, the rigidity of each electrode can be increased to increase the natural frequency of the electrode. Therefore, frequencies corresponding to 1/n (n: positive integer) of the natural frequency of the electrode can be shifted from the carrier wave frequency securely. In addition, in the third embodiment, because the side face of the electrode at the opposite side of the detection interval 40 protrudes to form the widened part, the other side face of the electrode defining the detection interval 40 can be made flat easily.

Forth Embodiment

Figure 12:
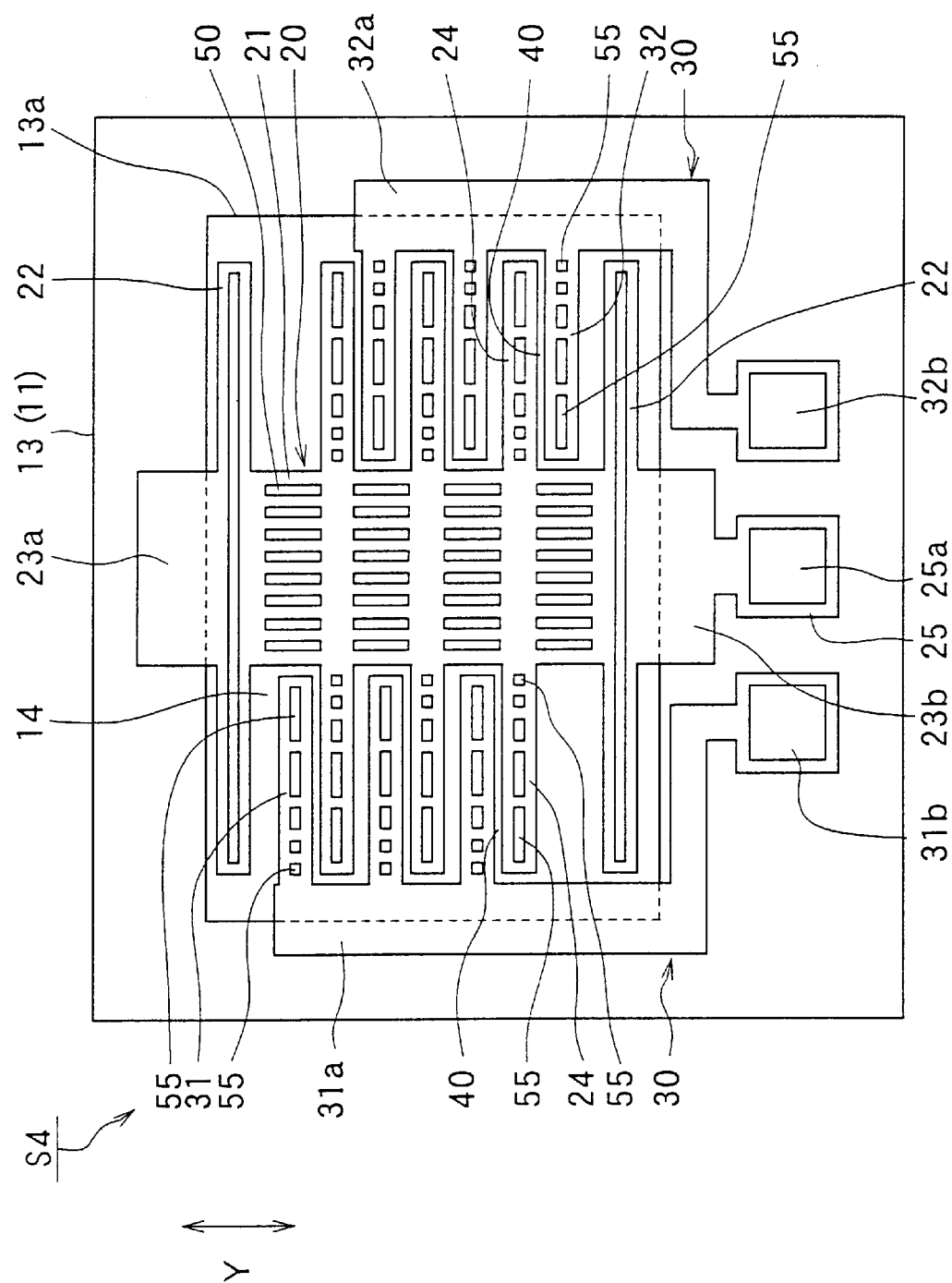
FIG. 12 is a plan view showing a semiconductor acceleration sensor according to a fourth preferred embodiment.

FIG. 12 shows a semiconductor acceleration sensor S4 according to a fourth preferred embodiment of the present invention. In the fourth embodiment, each electrode is modified in shape from that in the first to third embodiments and the same or similar parts as those are designated with the same reference numerals.

In the sensor S4 shown in FIG. 12, each of the movable electrodes 24 and the fixed electrodes 31, 32 is formed to have a rigid-frame structure with several rectangular openings 55, dimensions of which are different from each other. More specifically, the dimension of the opening 55 is decreased as the position of the opening 55 approaches from the tip portion to the root portion of the electrode.

Accordingly, in each of the movable electrodes 24 and the fixed electrodes 31, 32, the rigidity of the root portion can be made larger than that of the tip portion in the protruding direction of the electrode. In consequence, the natural frequency of each electrode can be increased, and frequencies corresponding to 1/n (n: positive integer) of the natural frequency of the electrode can be shifted from the carrier wave frequency securely.

In the first to forth embodiments described above, the rigidity of each electrode is increased by modifying the shape of the electrode. However, the length of each electrode may be shortened to increase the rigidity thereof. Further, in the second to fourth embodiments described above, each movable electrode 24 is formed into substantially the same shape as that of each fixed electrode 31, 32 to restrict the flexural vibration thereof. However, the fixed electrode is liable to resonate more easily than the movable electrode because the fixed electrode is not connected to the beam portions. In this connection, even when only the fixed electrode is formed into the shape as defined in the second to fourth embodiments, the effect of suppressing the flexural vibration of the electrode can be exhibited.

Each of the movable electrodes and the fixed electrodes needs not be always straight, but may be partially bent. Further, the movable electrode and the fixed electrode can define the detection interval at mutually facing portions other than the side faces thereof. The present invention is not limited to the semiconductor acceleration sensors S1 to S4 as described above, but may be applied to various type dynamic quantity sensors such as pressure sensors, yaw rate sensors, and angular velocity sensors.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A dynamic quantity sensor comprising:
   a base portion;
   a weight portion supported by the base portion to be displaced by a dynamic quantity applied thereto;
   a movable electrode integrally formed with the weight portion and protruding from the weight portion; and
   a fixed electrode protruding from the base portion and defining a detection interval with the movable electrode, the detection interval being changed by displacement of the weight portion to change a capacitance between the movable electrode and the fixed electrode for detecting the dynamic quantity, wherein:
   at least one of the movable electrode and the fixed electrode has a tapered plane shape, a width of which decreases from a root portion toward a tip portion of the one of the movable electrode and the fixed electrode.

2. The dynamic quantity sensor according to claim 1, wherein:
   the movable electrode is composed of a plurality of movable electrode members protruding from the weight portion in parallel with one another;
   the fixed electrode is composed of a plurality of fixed electrode members protruding from the base portion in parallel with one another, each of the plurality of fixed electrode members defining the detection interval with a corresponding one of the plurality of movable electrode members; and
   each of the plurality of movable electrode members has the tapered plane shape and has the width that decreases from the root portion at a side of the weight portion toward the tip portion thereof.

3. The dynamic quantity sensor according to claim 2, wherein each of the plurality of fixed electrode members has the tapered plane shape and has the width that is decreased from the root portion at a side of the base portion toward the tip portion thereof.

4. The dynamic quantity sensor according to claim 1, wherein the tapered plane shape is a trapezoid shape.

5. A dynamic quantity sensor comprising:
   a base portion;
   a weight portion supported by the base portion to be displaced by a dynamic quantity applied thereto;
   a movable electrode integrally formed with the weight portion and protruding from the weight portion; and
   a fixed electrode protruding from the base portion and defining a detection interval with the movable electrode, wherein:
   the dynamic quantity is detected based on a change in capacitance of the detection interval between the fixed electrode and the movable electrode while applying, to the fixed electrode and the movable electrode, carrier wave signals that periodically change with a carrier wave frequency, the carrier wave frequency being shifted from 1/n of a natural frequency of the fixed electrode when the fixed electrode performs flexural vibration, in which n is a positive integer.

6. The dynamic quantity sensor according to claim 5, wherein:
   the movable electrode is composed of first and second movable electrode members respectively protruding form the weight portion;
   the fixed electrode is composed of first and second fixed electrode members each defining the detection interval with a corresponding one of the first and second movable electrode members; and the carrier wave signals are applied to the first and second fixed electrode members with the carrier wave frequency.

7. The dynamic quantity sensor according to claim 5, wherein the carrier wave frequency is shifted from 1/n of a natural frequency of the movable electrode when the movable electrode performs flexural vibration, wherein n represents a positive integer.

8. The dynamic quantity sensor according to claim 5, wherein n represents 1 and 2.

9. The dynamic quantity sensor according to claim 5, wherein:

the weight portion is displaced in a displacement direction by the dynamic quantity; and the movable electrode has a pole shape and protrudes from the weight portion in a direction perpendicular to the displacement direction, the movable electrode having a root portion at a side of the weight portion;

the fixed electrode has a pole shape and protrudes from the base portion in the direction perpendicular to the displacement direction, the fixed electrode having a root portion at a side of the base portion; and in each of the movable electrode and the fixed electrode, the root portion has a width wider than that of a tip portion thereof to have a rigidity larger than that of the tip portion.

10. The dynamic quantity sensor according to claim 9, wherein a side face of each of the movable electrode and the fixed electrode at an opposite side of the detection interval protrudes in the displacement direction to form the root portion wider than the tip portion thereof.

11. The dynamic quantity sensor according to claim 5, wherein each of the movable electrode and the fixed electrode has a plurality of rectangular openings to form a rigid-frame structure, the plurality of rectangular openings being arranged in a protruding direction of the each electrode and having dimensions different from each other, the dimensions decreasing from a tip portion toward a root portion of the each electrode.

12. The dynamic quantity sensor according to claim 5, wherein:

self-diagnosis is performed by applying self-diagnosis carrier wave signals to the fixed electrode and the movable electrode when no dynamic quantity is applied to the weight portion; and the self-diagnosis carrier wave signals change periodically with a carrier wave frequency that is shifted from 1/n of the natural frequency of the fixed electrode.

13. The dynamic quantity sensor according to claim 12, wherein a ratio of the natural frequency of the fixed electrode with respect to the carrier wave frequency of the self-diagnosis carrier wave signals is less than 7.

14. A dynamic quantity sensor comprising:

a base portion;

a weight portion supported by the base portion to be displaced by a dynamic quantity applied thereto;

a movable electrode integrally formed with the weight portion and protruding from the weight portion; and a fixed electrode protruding from the base portion and defining a detection interval with the movable electrode, the detection interval being changed by the displacement of the weight portion to change a capacitance between the fixed electrode and the movable electrode for detecting the dynamic quantity, wherein:

each of the movable electrode and the fixed electrode has a root portion and a tip portion in a protruding direction thereof, the root portion having a rigidity larger than that of the tip portion.

15. The dynamic quantity sensor according to claim 14, wherein in each of the movable electrode and the fixed electrode, the root portion has a width wider than that of the tip portion.

16. A dynamic quantity sensor comprising:

a base portion;

a weight portion supported by the base portion to be displaced by a dynamic quantity applied thereto;

first and second movable electrodes integrally formed with the weight portion and protruding from the weight portion; and first and second fixed electrodes protruding from the base portion and respectively defining first and second detection intervals with the first and second movable electrodes, wherein:

first and second carrier wave signals having a first carrier wave frequency are respectively applied to the first and second fixed electrodes for detecting the dynamic quantity;

third and fourth carrier wave signals having a second carrier wave frequency are respectively applied to the first and second fixed electrodes for performing self-diagnosis; and the first carrier wave frequency and the second carrier wave frequency are shifted from 1/n of a natural frequency of each of the first and second fixed electrodes when the first and second fixed electrodes perform flexural vibration, in which n is a positive integer.

17. The dynamic quantify perform sensor according to claim 16, wherein the first carrier wave frequency and the second carrier wave frequency are shifted from 1/n of a natural frequency of each of the first and second movable electrodes when the first and second movable electrodes perform flexural vibration.

18. The dynamic quantify sensor according to claim 16, wherein a ratio of the natural frequency with respect to the second carrier wave frequency is less than 7.

19. The dynamic quantity sensor according to claim 16, wherein n represents 1 and 2.

* * * * *